US011775147B2

(12) United States Patent
Ide (10) Patent No.: US 11,775,147 B2
(45) Date of Patent: Oct. 3, 2023

(54) INK ANNOTATION SHARING METHOD AND SYSTEM

(71) Applicant: Wacom Co., Ltd., Saitama (JP)

(72) Inventor: Nobutaka Ide, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/498,628

(22) Filed: Oct. 11, 2021

(65) Prior Publication Data

US 2022/0027026 A1 Jan. 27, 2022

Related U.S. Application Data

(63) Continuation of application No. PCT/JP2020/009050, filed on Mar. 4, 2020.
(Continued)

(51) Int. Cl.
*G06F 3/0483* (2013.01)
*G06F 40/169* (2020.01)
(Continued)

(52) U.S. Cl.
CPC ........ *G06F 3/0483* (2013.01); *G06F 3/04883* (2013.01); *G06F 3/1454* (2013.01); *G06F 40/169* (2020.01)

(58) Field of Classification Search
CPC .. G06F 3/0483; G06F 3/04883; G06F 3/1454; G06F 40/169; G06F 3/03545;
(Continued)

(56) References Cited

U.S. PATENT DOCUMENTS 7,158,675 B2 1/2007 Gounares et al.
7,337,389 B1 * 2/2008 Woolf ................... G06F 40/169
707/999.102

(Continued)

FOREIGN PATENT DOCUMENTS

JP 2003-58137 A 2/2003
JP 2004-151899 A 5/2004
JP 5886487 B1 3/2016

OTHER PUBLICATIONS

International Search Report, dated May 26, 2020, for International Application No. PCT/JP2020/009050, 2 pages.

*Primary Examiner* — Jeanette J Parker
(74) *Attorney, Agent, or Firm* — Seed IP Law Group LLP (57) ABSTRACT

An ink annotation sharing method is carried out in a system, which includes a first terminal operable by a first user, a second terminal operable by a second user, and an ink annotation sharing system. The ink annotation includes a stroke data set indicating an annotation added to an electronic book and metadata. The metadata includes a user identifier, a book identifier, and place data indicating a place of the annotation. The method includes transmitting, by the first terminal, the ink annotation generated by an operation of the first user, to the ink annotation sharing system; identifying, by the ink annotation sharing system, the second user who is a member of a group that relates to the electronic book and that is configured by the first user based on the user and book identifier values; and supplying, by the ink annotation sharing system, the ink annotation to the second terminal.

20 Claims, 10 Drawing Sheets

Related U.S. Application Data

(60) Provisional application No. 62/835,118, filed on Apr. 17, 2019.

(51) Int. Cl.
*G06F 3/04883* (2022.01)
*G06F 3/14* (2006.01)

(58) Field of Classification Search
CPC .... G06F 3/0482; G06F 3/04842; G06F 3/048; G06F 40/171; G09G 2380/14
See application file for complete search history.

(56) References Cited

U.S. PATENT DOCUMENTS

| | | | |
|---|---|---|---|
| 7,397,949 B2 | 7/2008 | Dresevic et al. | |
| 9,251,130 B1* | 2/2016 | Lynnes | G06Q 10/10 |
| 2013/0318465 A1* | 11/2013 | Cheng | G06F 3/0483 |
| | | | 715/776 |
| 2016/0043974 A1* | 2/2016 | Purcell | H04L 67/141 |
| | | | 715/758 |
| 2016/0048318 A1* | 2/2016 | Markiewicz | G06F 3/04842 |
| | | | 345/173 |
| 2016/0292500 A1 | 10/2016 | Angelov et al. | |

* cited by examiner

```
         START
           │
    ┌──────▼──────┐
S201│ ACQUIRE ELECTRONIC BOOK │
    └──────┬──────┘
           │◄─────────────────────────┐
    ┌──────▼──────┐                   │
S203│ DISPLAY DISPLAYED TEXT dt │     │
    └──────┬──────┘                   │
           │◄──────────┐              │
          ╱╲           │              │
S205     ╱  ╲   NO     │              │
        ╱ANNO╲─────────┘              │
        ╲OP S?╱                       │
         ╲  ╱                         │
          ╲╱                          │
           │ YES                      │
    ┌──────▼──────┐                   │
S207│ IDENTIFY ANNOTATION PLACE P │   │
    └──────┬──────┘                   │
           │                          │
          ╱╲                          │
S209     ╱  ╲  BY PEN SENSOR          │
        ╱OP S ╲──────────┐            │
        ╲TO ID ╱         │            │
         ╲P?  ╱          ▼            │
          ╲╱         ┌────────┐       │
           │ BY OTHER│ SET "pen" IN │  │
           │ THAN PEN│ OPERATION   │S213│
           │ SENSOR  │ IDENT DATA ST│  │
    ┌──────▼──────┐  └──────┬──────┘  │
S211│ SET "non-pen" IN │    │         │
    │ OPERATION        │    │         │
    │ IDENTIFICATION ST│    │         │
    └──────┬──────┘◄───────┘         │
           │                          │
          ╱╲                          │
S215     ╱  ╲   YES ┌─────────────────┐
        ╱ACTIV╲─────┤                 │
        ╲COND ╱     │          ┌──────▼──────┐
         ╲HW?╱      │      S219│ RECORD PEN COORDINATE DATA SET │
          ╲╱        │          │ THROUGH HANDWRITING INPUT WINDOW│
           │ NO     │          └──────┬──────┘
    ┌──────▼──────┐ │                 │
S217│ ADD OPERATION│ │          ┌──────▼──────┐
    │ IDENT DATA ST│ │      S221│ CAUSE PEN COORDINATE DATA │
    │ TO PLACE DATA│ │          │ SET sd AND PLACE DATA P TO│
    │ p AND TRANSMIT│ │         │ BE INCLUDED IN INK        │
    │ INK ANNOT IA │ │          │ ANNOTATION IA AND         │
    └──────┬──────┘ │          │ TRANSMIT INK ANNOTATION IA│
           │        │          └──────┬──────┘
           └────────┴─────────────────┘
```

101 dt {
...abcdefghijklmn
opqrstuvwxyz... A1

...ABCDEFGHIJKLMN
OPQRStUVWXYZ...  } p1

...abcdef       ...012345
ghijklm         6789012
nopqrst         3456789
uvwxyz...       0123456
                7890123
A1 (ST="pen")   4567890
...ABCDEF       1234567
GHIJKLM         8901234
NOPQRSt         567890...
UVWXYZ...

INK ANNOTATION SHARING METHOD AND SYSTEM

BACKGROUND

Technical Field

The present invention relates to a method and a system for sharing an annotation made on an electronic book, particularly, an ink annotation input made by an electronic pen.

Description of the Related Art

Digital ink generated from an electronic pen is data used to reproduce the trace made by the electronic pen, which is similar to the trace left on paper by a conventional pen used to perform handwriting. An example of digital ink that is an object-based data model residing in a computer is disclosed in U.S. Pat. No. 7,158,675, and an example of a serialization format used for digital ink is disclosed in U.S. Pat. No. 7,397,949.

Another type of digital ink data is known that goes beyond merely reproducing handwritten traces and that enables recording of "when, by whom, where, in what situation" the handwriting has been performed by a person to leave the trace. For example, Japanese Patent No. 5886487 discloses digital ink that makes it possible to identify who has written stroke data that represents the trace. U.S. Pat. No. 9,251,130 discloses digital ink that allows acquisition of information as context data when stroke data is input, such as the author information, a pen identifier (ID), clock time information, and location information acquired by the global positioning system (GPS), and recording the acquired context data as metadata.

An electronic book terminal is known that allows for making an annotation, such as highlighting a part of text included in an electronic book, or adding text in association with the highlighted part. U.S. Pat. No. 7,158,675 discloses a system in which annotations such as highlighting or text added to an electronic book are shared among members of a book club.

BRIEF SUMMARY

An annotation made by handwriting using a pen (hereinafter "ink annotation"), as opposed to an annotation input as text, has a certain creative value. It may be desirable to separate out the ink annotation from the management system of the electronic book so that the ink annotation can be shared among users who may have different supply sources of the electronic book or who do not own the electronic book.

The electronic book is displayed with a different column setting according to particular display settings of a terminal such as a display resolution, a font size, and so forth. When an annotation is highlighting, it may be desirable to share the ink annotation such that a viewer can recognize that the highlight has been handwritten using a pen, on various electronic book terminals having different display settings. It may also be desirable that, when an annotation is a handwritten illustration (that is, stroke data), the ink annotation can be shared such that a viewer can recognize the illustrated work regardless of the display settings of the particular electronic book terminal or the pen type compatibility.

An ink annotation sharing method according to a first aspect of the present invention is a method carried out in a system including a first terminal operated by a first user, a second terminal operated by a second user, and an ink annotation sharing system. The ink annotation includes a stroke data set indicating an annotation for an electronic book and metadata associated with the stroke data set. The metadata includes a user identifier that identifies a user, a book identifier that identifies an electronic book, and place data indicating a place of the annotation. The ink annotation sharing method includes transmitting, from the first terminal to the ink annotation sharing system, the ink annotation generated by an operation of the first user; identifying, by the ink annotation sharing system, the second user who is a member of a group that that relates to the electronic book and that is configured by the first user based on values of the user identifier and the book identifier included in the ink annotation; and supplying, by the ink annotation sharing system, the ink annotation to the second terminal operated by the second user.

A system according to a second aspect of the present invention includes a first terminal operated by a first user, a second terminal operated by a second user, and an ink annotation sharing system. The ink annotation includes a stroke data set indicating an annotation for an electronic book and metadata associated with the stroke data set. The metadata includes a user identifier that identifies a user, a book identifier that identifies an electronic book, and place data indicating a place of the annotation. The first terminal transmits the ink annotation generated by an operation of the first user to the ink annotation sharing system. The ink annotation sharing system identifies the second user who is a member of a group that relates to the electronic book and that is configured by the first user based on values of the user identifier and the book identifier included in the ink annotation. The ink annotation sharing system supplies the ink annotation to the second terminal operated by the second user.

An ink annotation sharing method according to a third aspect of the present invention is a method for sharing an ink annotation that is input by using an electronic book terminal. The electronic book terminal includes a display device capable of displaying an electronic book, a touch sensor that detects a finger, a pen sensor that detects a pen, and an integrated circuit connected to each of the touch sensor and the pen sensor. The ink annotation sharing method includes displaying, by the integrated circuit using the display device, text that is part of the electronic book; detecting, by the integrated circuit using the touch sensor and the pen sensor, an operation that specifies a place of an annotation on the text; carrying out, by the integrated circuit, a determination as to which sensor of the touch sensor and the pen sensor has detected the operation; and outputting, by the integrated circuit, place data indicating the place of the annotation in a manner such that a result of the determination is identifiable.

A system according to a fourth aspect of the present invention is a system using an electronic book terminal, which includes a display device capable of displaying an electronic book, a touch sensor that detects a finger, a pen sensor that detects a pen, and an integrated circuit connected to each of the touch sensor and the pen sensor. The integrated circuit, using the display device, displays text that is part of the electronic book, detects, using the touch sensor and the pen sensor, an operation that specifies a place of an annotation on the text, carries out an determination as to which sensor of the touch sensor and the pen sensor has detected the operation, and outputs place data indicating the place of the annotation in a manner such that a result of the determination is identifiable.

According to the first and second aspects of the present invention, a handwritten ink annotation can be shared by persons who have purchased the same title of the electronic book from different supply sources of the electronic book. Further, an ink annotation including a handwritten illustration of artwork can be shared with a user who has not purchased the electronic book.

According to the third and fourth aspects of the present invention, when a pen is used to carry out the operation to specify an annotation place, a user with whom the annotation is shared can recognize that a pen is used to handwrite in the annotation such as highlighting.

DETAILED DESCRIPTION

An ink annotation sharing method and a system according to embodiments of the present invention will be described with reference to the accompanying drawings. To facilitate understanding of the disclosure, the same constituent elements and steps are given the same symbols as far as possible in the respective drawings, and overlapping description is omitted in some cases. It is obvious that the present invention is not limited to the embodiments described below and can be freely changed without departing from the disclosure of the invention. Alternatively, the respective configurations may be combined in a desired manner as long as no technical contradiction is created.

Description of Embodiments

Figure 1:
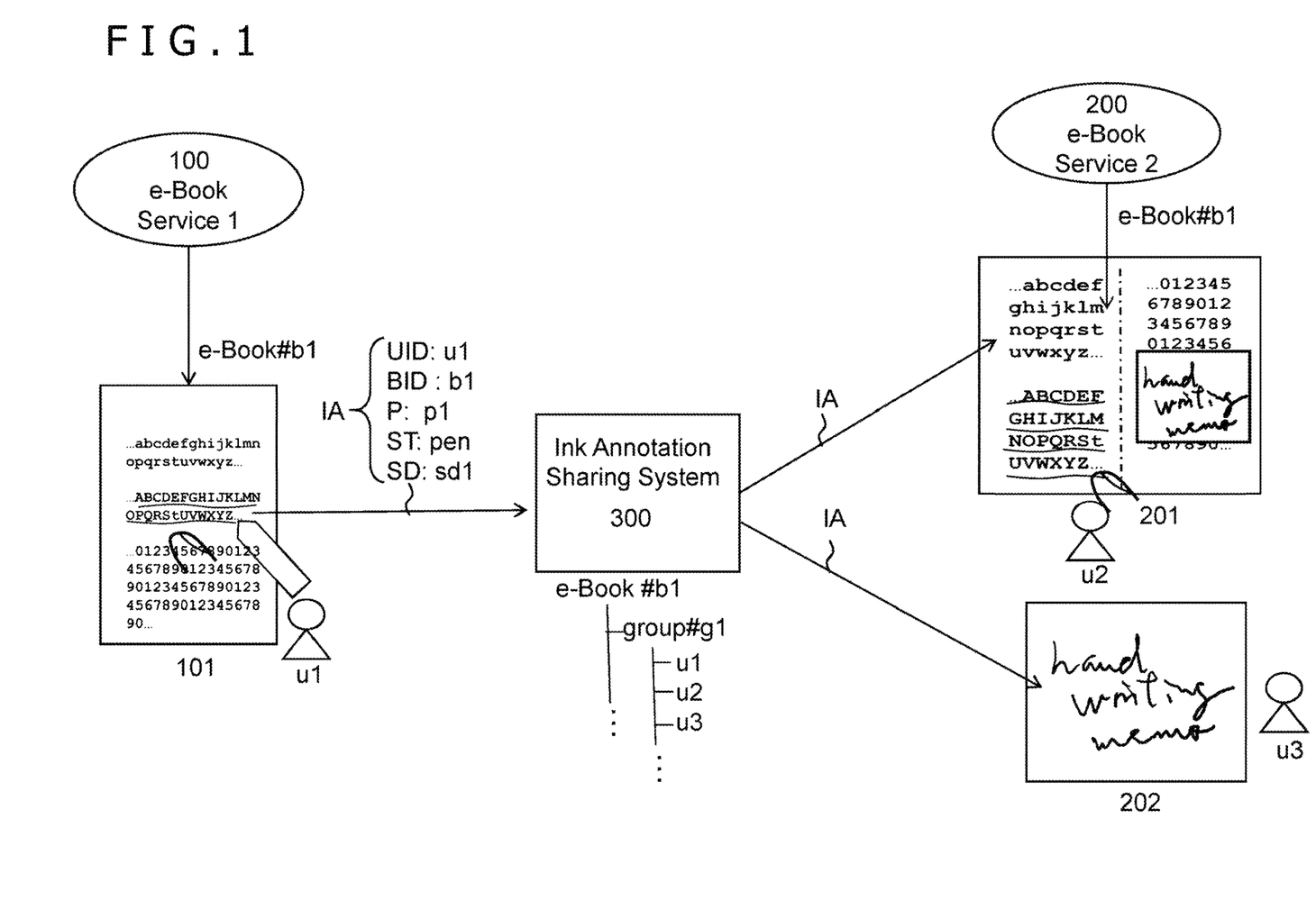
FIG. 1 is an overall diagram of a system in which ink annotations are shared.

FIG. 1 is an overall diagram of a system in which ink annotations are shared. The system includes a first terminal (hereinafter, also referred to as an "electronic book terminal 101"), second terminals (hereinafter, also referred to as "terminals 201 and 202" simply), and a sharing system 300 of ink annotations (or "ink annotation sharing system").

The electronic book terminal 101 includes a display device, a touch sensor that detects a finger, a pen sensor that detects a pen, and an integrated circuit that controls them, which are not particularly illustrated in FIG. 1 but can be configured by those skilled in the art according to the present disclosure. The electronic book terminal 101 is operated by a first user u1 who subscribes to a first electronic book service 100.

The terminal 201 includes a display device, a touch sensor, and an integrated circuit similarly to the electronic book terminal 101, but does not include a pen sensor. The terminal 201 is operated by a second user u2 who subscribes to a second electronic book service 200. Further, the terminal 201 has a different display setting from the display setting of the electronic book terminal 101. The "display setting" includes, for example, a display resolution and a display area (a font size, a column setting, and so forth).

The terminal 202 is a general-purpose display terminal, such as a smartphone, that is not specialized for electronic books. The terminal 202 is operated by a third user u3 different from the users u1 and u2 who both own an electronic book. The user u3 may be a member of a group (g1) in a service provided by the ink annotation sharing system 300 but does not own the electronic book.

The ink annotation sharing system 300 is a system implemented by a computer constructed on a network in a distributed or assembled manner. The ink annotation sharing system 300 carries out an ink annotation sharing method illustrated in FIG. 7, to be described later, and causes a handwritten annotation A made on an electronic book (e-Book #b1) by the first user u1 to be shared with the second user u2 or the third user u3 who is a member of a group which relates to the electronic book and to which the first user u1 belongs. That is, the group may be configured by a combination of the electronic book and the users and may be managed by a system that operates an ink annotation supply service independent of a supply source of the electronic book.

Figure 2:
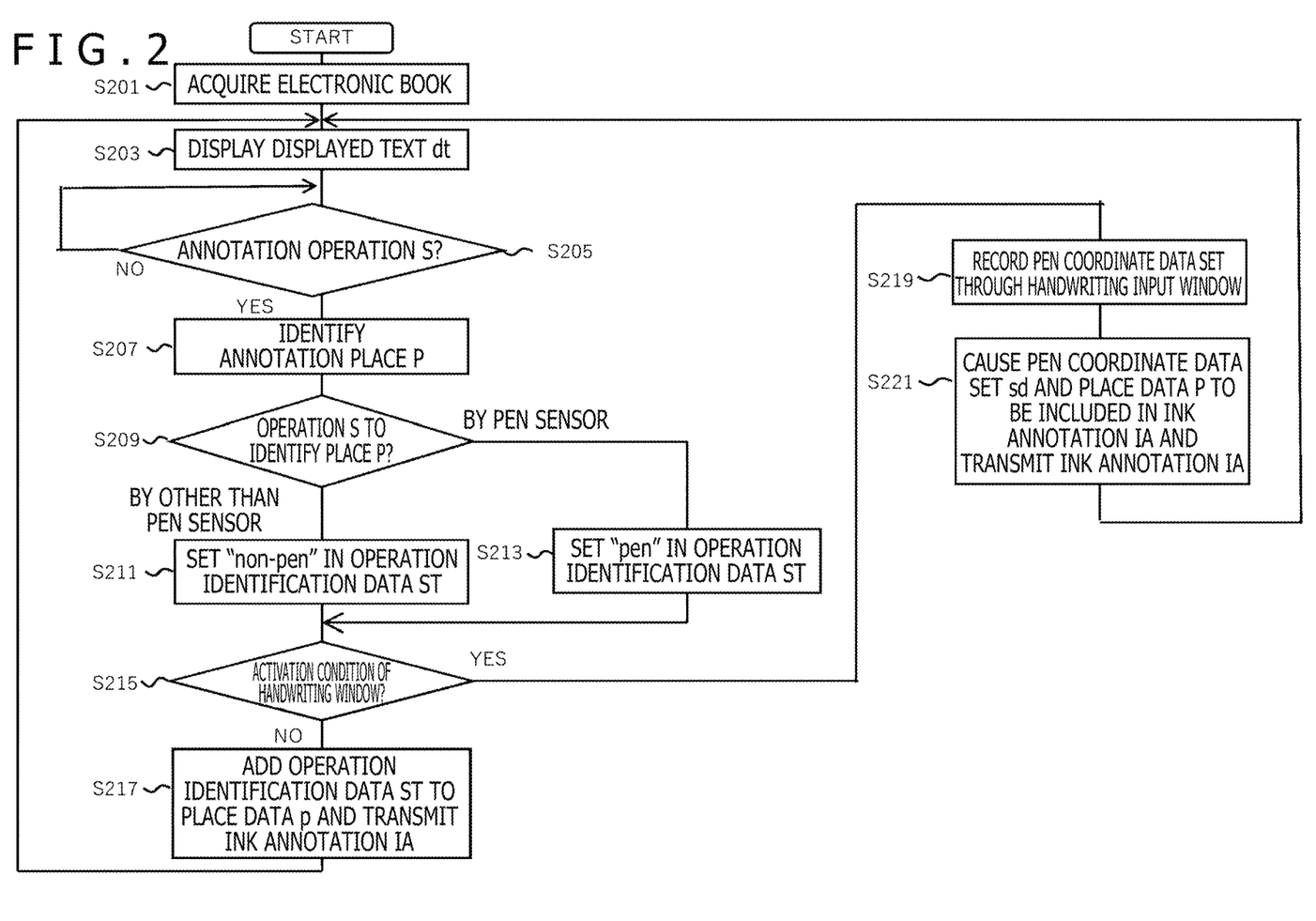
FIG. 2 is a flowchart relating to an operation of an electronic book terminal.

FIG. 2 is a flowchart relating to operation of the electronic book terminal 101.

In step S201, the electronic book terminal 101 acquires an electronic book about which a value of a book identifier BID is "b1." The book identifier BID is the international standard book number (ISBN), for example.

Figure 3A:
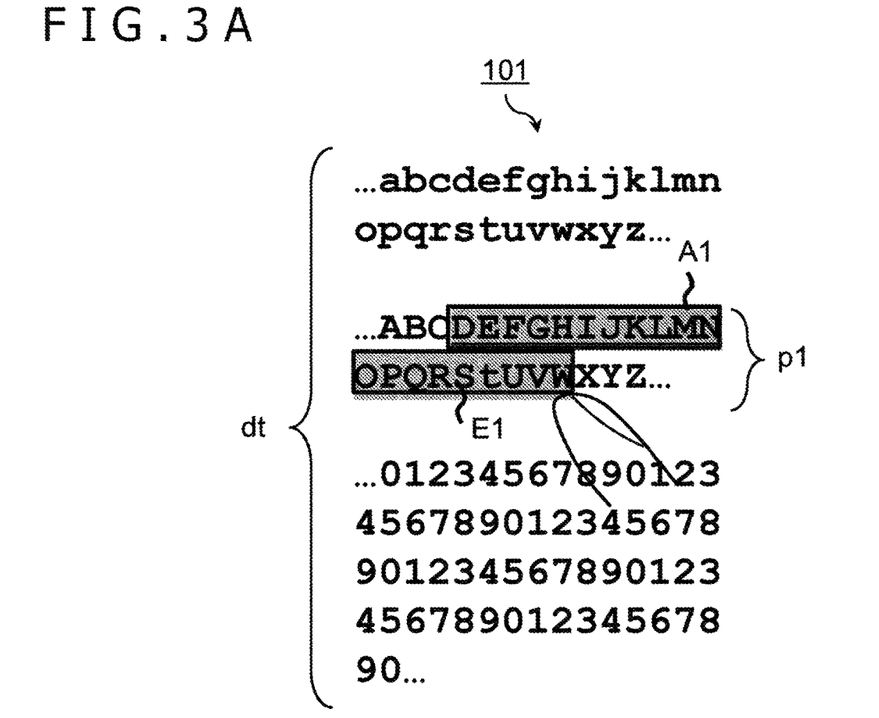
FIG. 3A is a diagram illustrating a display state of an annotation on the electronic book terminal.
Figure 4A:
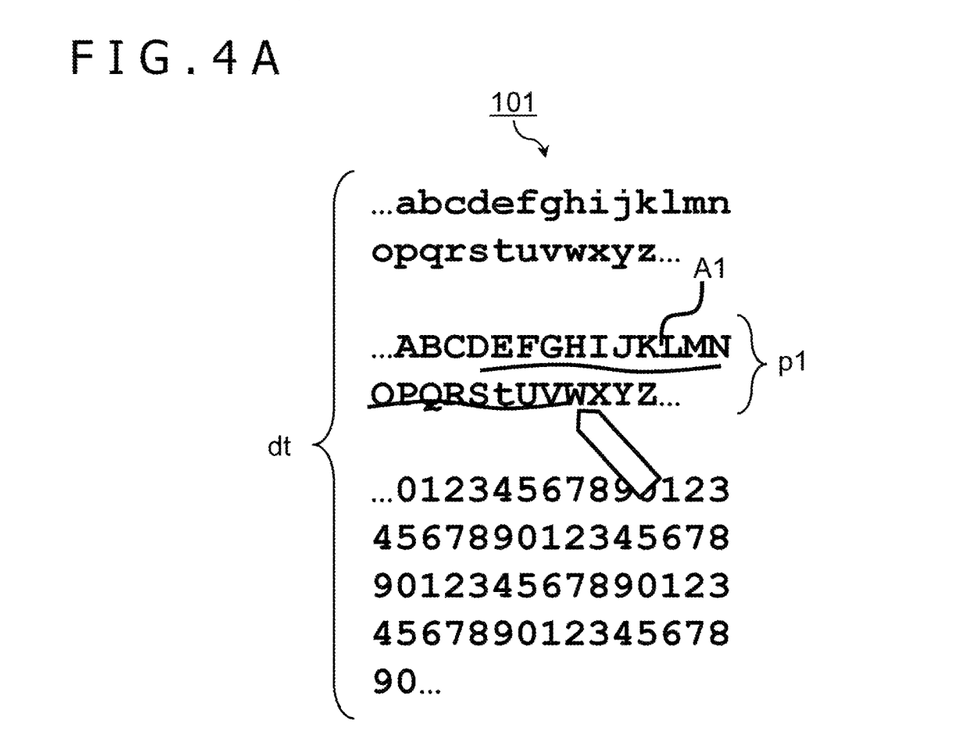
FIG. 4A is a diagram illustrating a display state of an annotation on the electronic book terminal.

In step S203, the electronic book terminal 101 displays displayed text dt in accordance with the display setting, according to a predetermined display position of the electronic book e-Book #b1 (a view position of the user). FIG. 3A and FIG. 4A show one example of the displayed text dt displayed by the electronic book terminal 101.

In step S205, the electronic book terminal 101 determines whether or not operation S to make an annotation has been carried out on the displayed text dt. When the operation S to make an annotation is detected (YES of S205), in step S207, the electronic book terminal 101 generates place data indicating a place P at which the annotation is made. There are various methods to specify the place P. When the electronic book has an extensible markup language (XML) structure in accordance with a predetermined book format, a method may be used to recognize a chapter or a section in the electronic book based on a position of a tag having a value associated with a paragraph position corresponding to the place P, and to identify positions of a starting character and an ending character within the recognized chapter or section. When the electronic book is distributed with its the page number and so forth fixed, a method may be used to identify the place P based on the page number or coordinates in the page.

In step S209, the electronic book terminal 101 determines whether or not the operation S that identifies the place P has been carried out by the pen sensor. When the operation S has been carried out by the touch sensor or the like, the electronic book terminal 101 sets "non-pen (non-handwriting)" in operation identification data ST (step S211). Conversely, when the operation S has been carried out by the pen sensor, the electronic book terminal 101 sets "pen (handwriting or ink)" in the operation identification data ST (step S213).

Figure 3B:
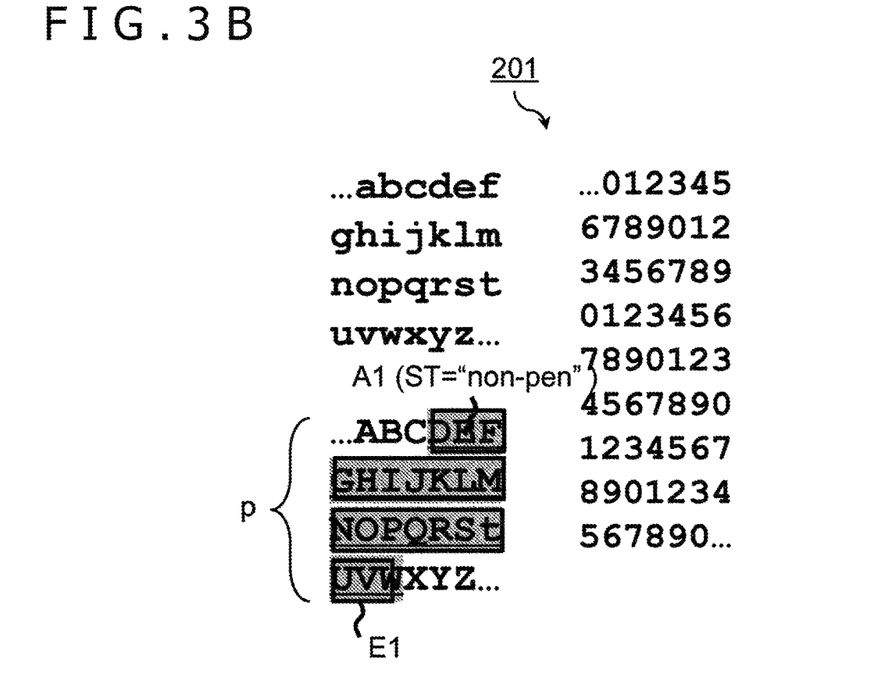
FIG. 3B is a diagram illustrating a display state of the annotation on a terminal.
Figure 10:
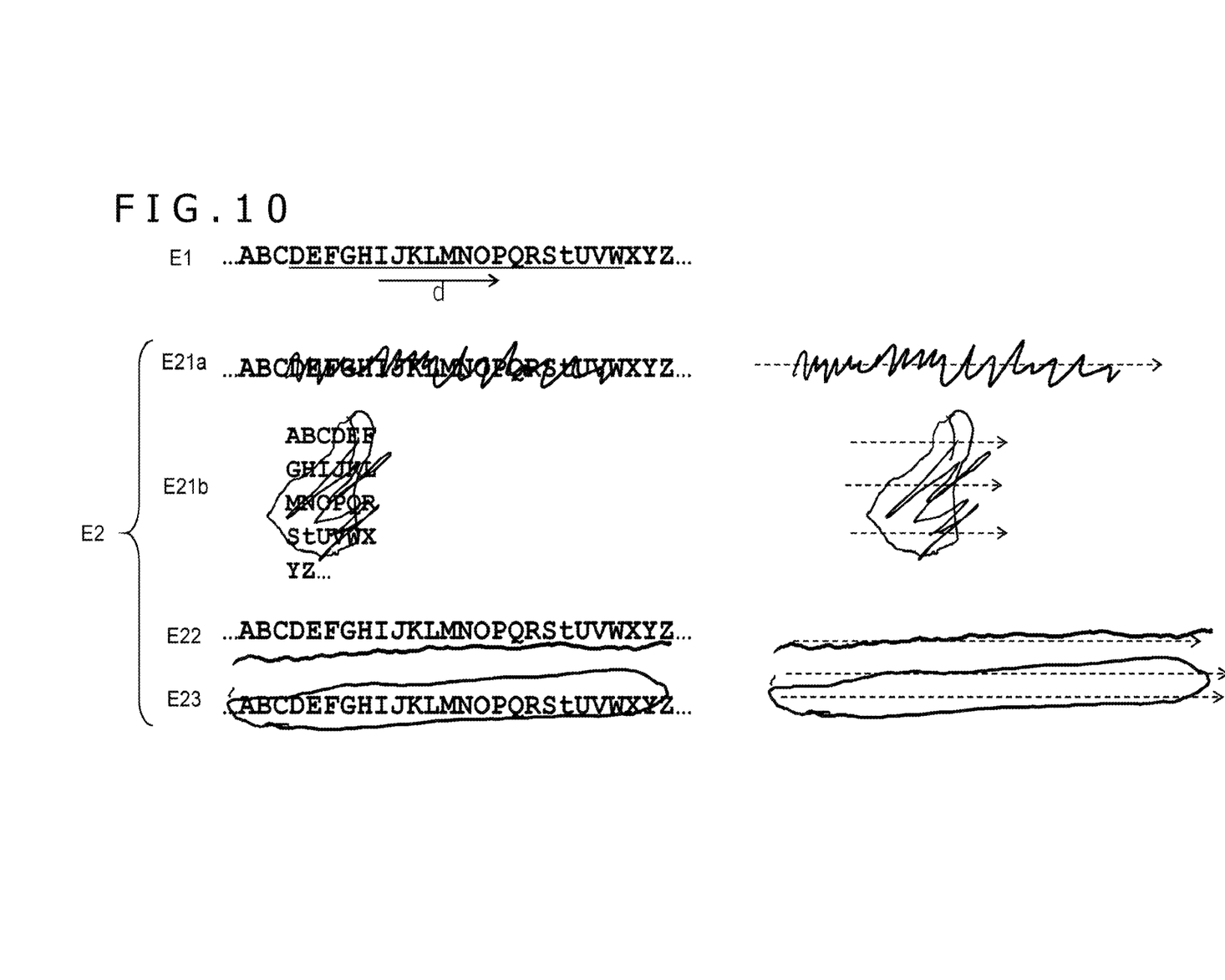
FIG. 10 is a diagram illustrating examples of first and second rendering effects.

FIG. 3A, FIG. 3B, and FIG. 10 (row of E1) illustrate display states of the electronic book terminal 101 and the terminal 201 in the case in which the operation S has been carried out by a sensor (for example, the touch sensor) that is not the pen sensor. FIG. 3A illustrates a state in which "DEF . . . UVW" has been identified as the place P of an annotation by a finger, for example. The finger is larger compared with the pen in terms of a diameter of a contact area with a panel. Therefore, it is difficult to use the finger to specify a fine position on each character that forms text. Thus, as illustrated in the diagrams, the electronic book terminal 101 carries out, at the identified position, an annotation A1 by realizing a first rendering effect E1 based on highlighting (or underlining) with a line segment along an arrangement direction of text characters (a direction of an arrow d in FIG. 10), which appears not "handwritten" with a pen held by a user.

Figure 4B:
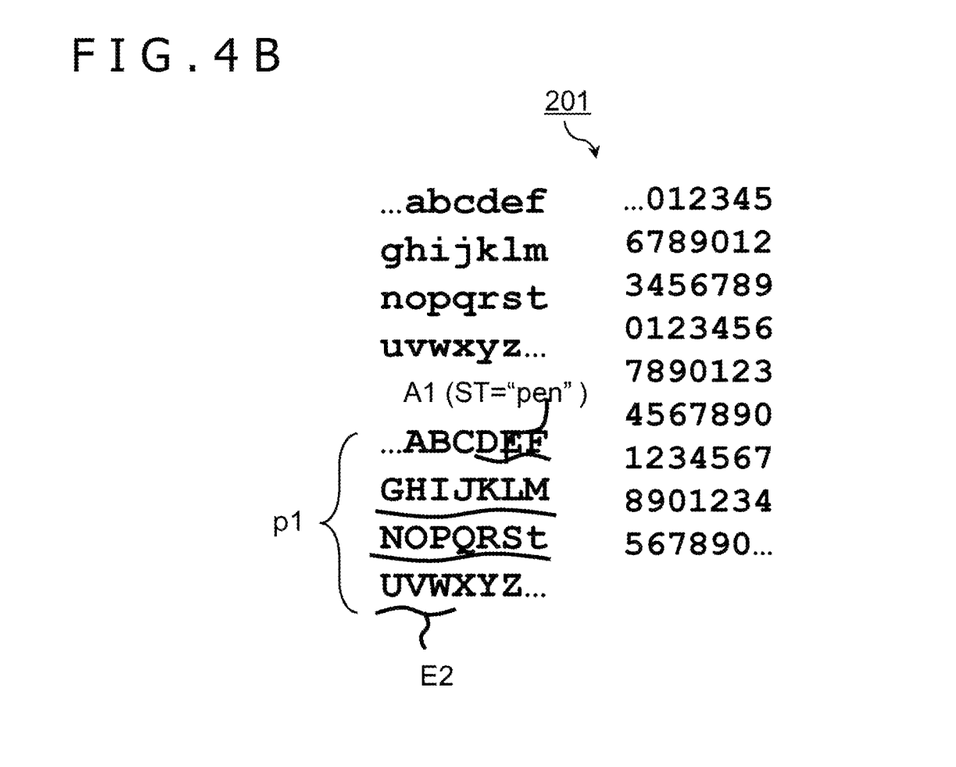
FIG. 4B is a diagram illustrating a display state of the annotation on the terminal.

In contrast, FIG. 4A, FIG. 4B, and FIG. 10 (rows of E2) illustrate display states of the electronic book terminal 101 and the terminal 201 in the case in which the operation S has been carried out by the pen sensor. The pen has a smaller diameter compared with the finger and therefore can specify finer positions on characters. For example, the pen can be used to perform a fine operation such as underlining, drawing an enclosing line, or drawing a double line for characters. As illustrated in FIG. 4A, on the electronic book terminal 101, the annotation A1 is made by highlighting, underlining, or drawing an enclosing line along the text direction at the position identified with a pen. That is, the annotation A1 may be made that closely follows the operation S of the first user u1. However, as illustrated in FIG. 4B, on the terminal 201 having a different display setting from the electronic book terminal 101, the annotation A1 by highlighting appears at a position (within the display) different from the intended position, due to the different column setting, when a coordinate data set in the electronic book terminal 101 is used as it is.

Thus, in step S213, the electronic book terminal 101 generates an ink annotation IA, which does not include the coordinate data set of the pen used for the operation S but which includes, in addition to the place P of an annotation, information indicating that the annotation has been made at the position by handwriting (pen) as the value of the operation identification data ST. For example, the electronic book terminal 101 transmits the generated ink annotation IA in response to a contact being made with a "SHARE" button 503 in FIG. 5 as a trigger (step S217).

Figure 5:
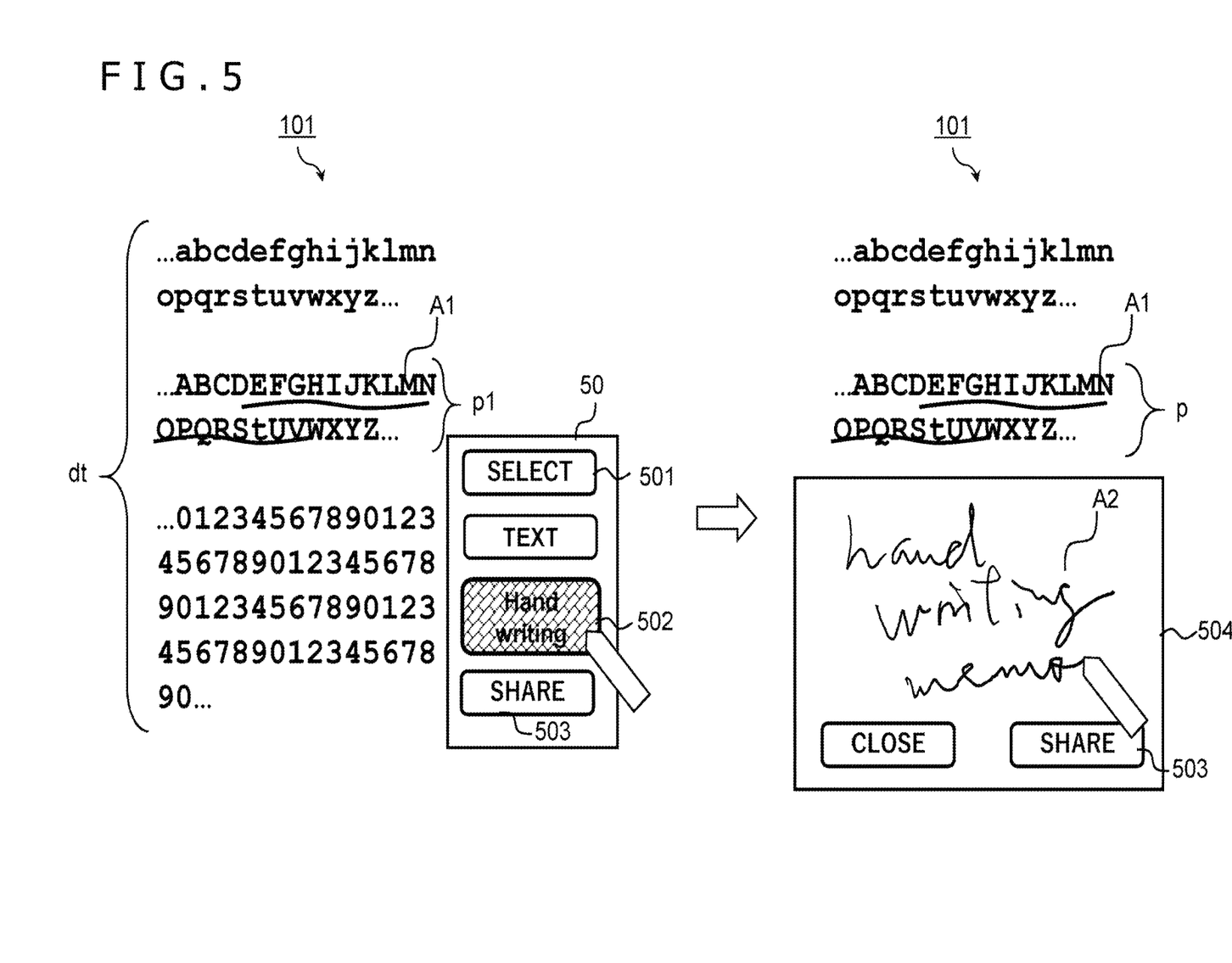
FIG. 5 is a diagram illustrating a user interface (UI) component relating to supply of the ink annotation.

Prior to the execution of step S217, in step S215, the electronic book terminal 101 may determine whether or not an activation condition of a handwriting area is satisfied. This determination is made in order to accept, at the place P to which an annotation such as highlighting has been added, a request to input further annotation data by handwriting. For example, the electronic book terminal 101 may display a UI portion 50 in FIG. 5, wherein a "SELECT" button 501 may be activated to allow copying or clipping of the identified place P or a "Handwriting" button 502 may be activated to accept an input of further handwriting. The right-hand side of FIG. 5 illustrates an example of a handwriting input window 504 displayed by the electronic book terminal 101 in step S219 when the first user u1 selects the "Handwriting" button 502 on the UI portion 50.

Referring back to FIG. 2, in step S221, the electronic book terminal 101 outputs a pen coordinate data set sd input through the handwriting input window 504, together with the place P of the annotation and the operation identification data ST. The pen coordinate data set sd is data that, unlike the annotation A1 used to add highlighting, does not have a relation to the column setting and has independent positional meaning within the coordinate system. Therefore, unlike the operation to identify the place P to which the annotation A1 has been added, this operation needs to be able to share the pen coordinate data set itself (or the raster data generated based on the pen coordinate data set).

As described above, in both of steps S221 and S217, the place P to which an annotation is added is transmitted, but the pen coordinate set acquired at the time of a pen operation to identify the place P is not transmitted. This makes it possible to reduce the data amount of the ink annotation IA.

While the handwriting input window 504 is activated, coordinate values of the coordinate data set sd input in the handwriting input window 504 may be transmitted "as is," or the coordinate data set sd may be processed into a digital ink format as disclosed in U.S. Patent Publication No. 2016/0292500 for example, then transmitted.

Figure 6:
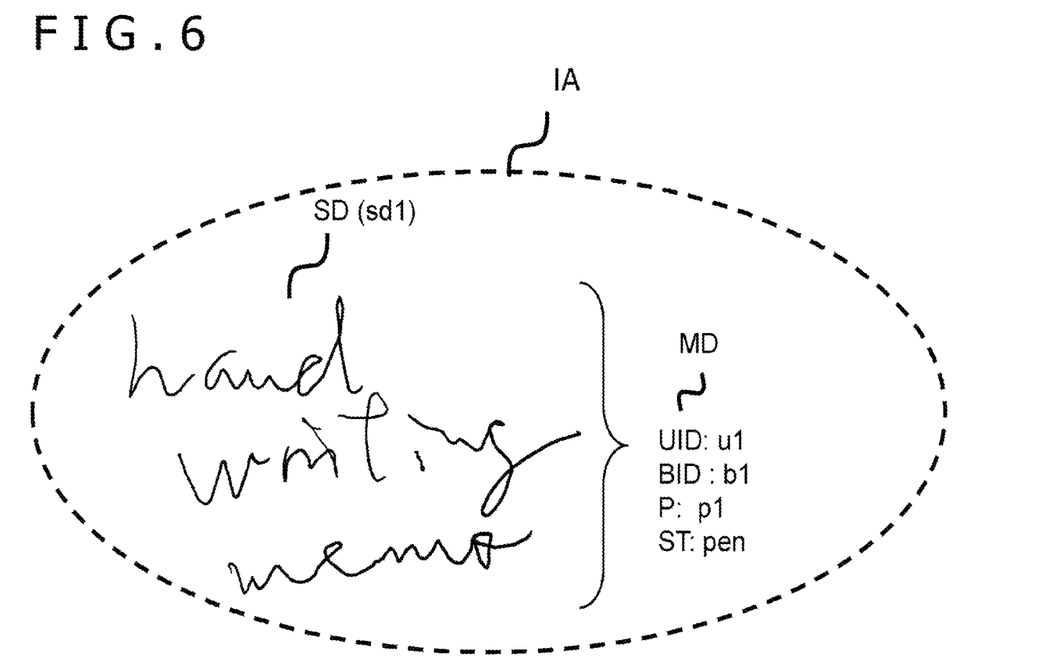
FIG. 6 illustrates a data structure of an ink annotation in accordance with a format of digital ink.

FIG. 6 is a data structure diagram of the ink annotation IA in accordance with a digital ink format. The digital ink represents a trace left by a sliding operation along a series of positions starting at a pen-down position and ending at a pen-up position, as one piece of stroke data (path data). A collection of multiple pieces of stroke data is held as a stroke data set SD. It is possible to add metadata MD to the stroke data set SD. The metadata MD may include, in addition to information indicating that an author who has inputted an annotation A2 by handwriting is the first user u1 for example, a user identifier UID, the book identifier BID, and the place P. When the handwriting input window 504 is opened, the data itself indicates that an annotation is made by handwriting, and therefore, the operation identification data ST does not have to be included in the metadata MD.

Figure 7:
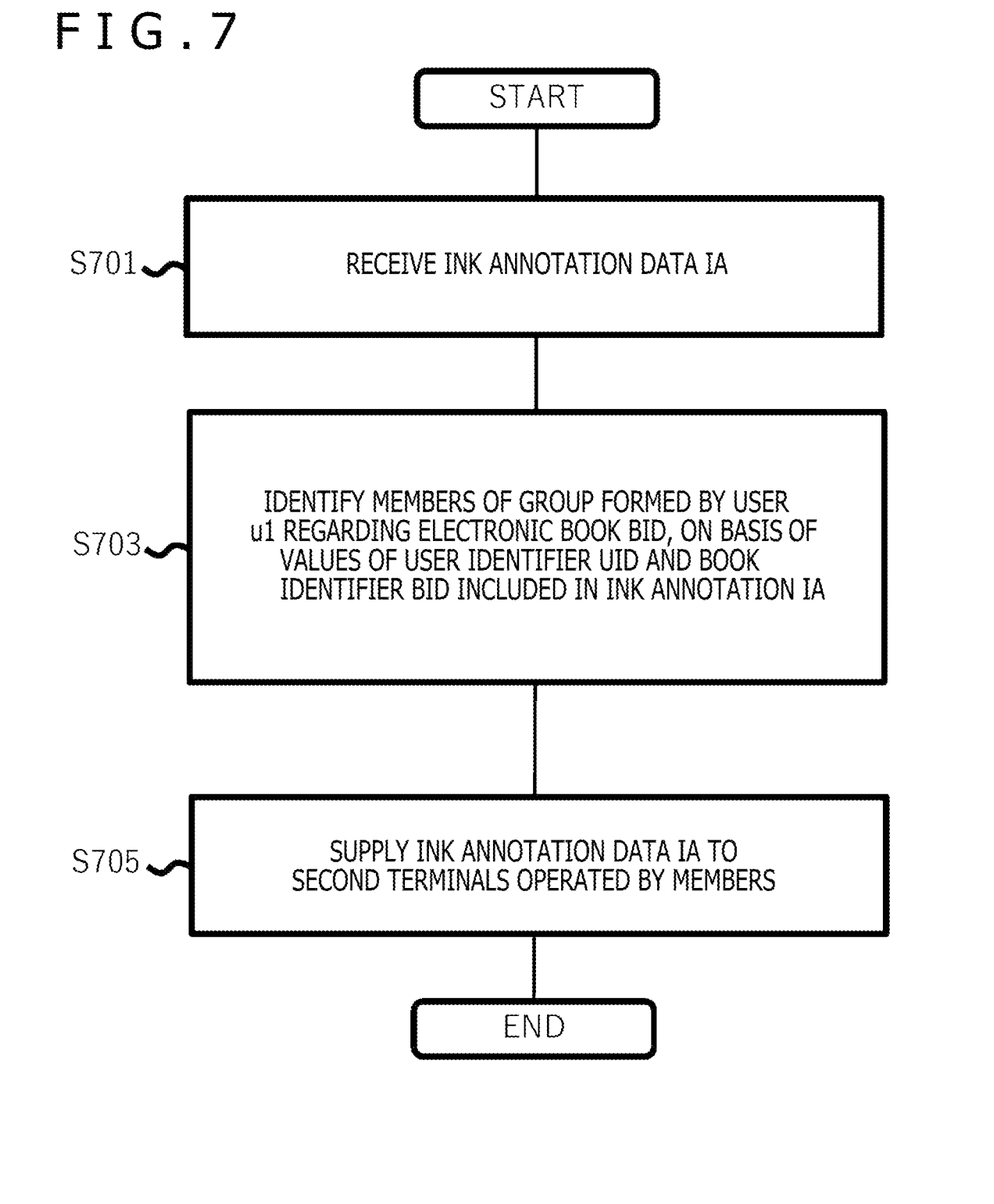
FIG. 7 is a flowchart relating to a sharing method of the ink annotation carried out in a sharing system.

FIG. 7 is a flowchart relating to a sharing method of the ink annotation IA carried out in the ink annotation sharing system 300.

In step S701, the ink annotation sharing system 300 acquires the ink annotation IA formed of digital ink from the electronic book terminal 101 operated by the first user u1. Next, in step S703, the ink annotation sharing system 300 identifies the second user u2 and the third user u3 who are the members of the group relating to the electronic book, in the case of the example of FIG. 1, based on the values of the user identifier UID and the book identifier BID included in the ink annotation IA. Finally, in step S705, the ink annotation sharing system 300 supplies the ink annotation IA to the terminals 201 and 202 operated by the respective members.

According to the above-described operation, the handwritten ink annotation IA can be shared by persons who have purchased the same title of the electronic book even from different supply sources of the electronic book. Further, the ink annotation IA including a handwritten illustration or artwork can be shared with a user who has not purchased the electronic book.

Figure 8:
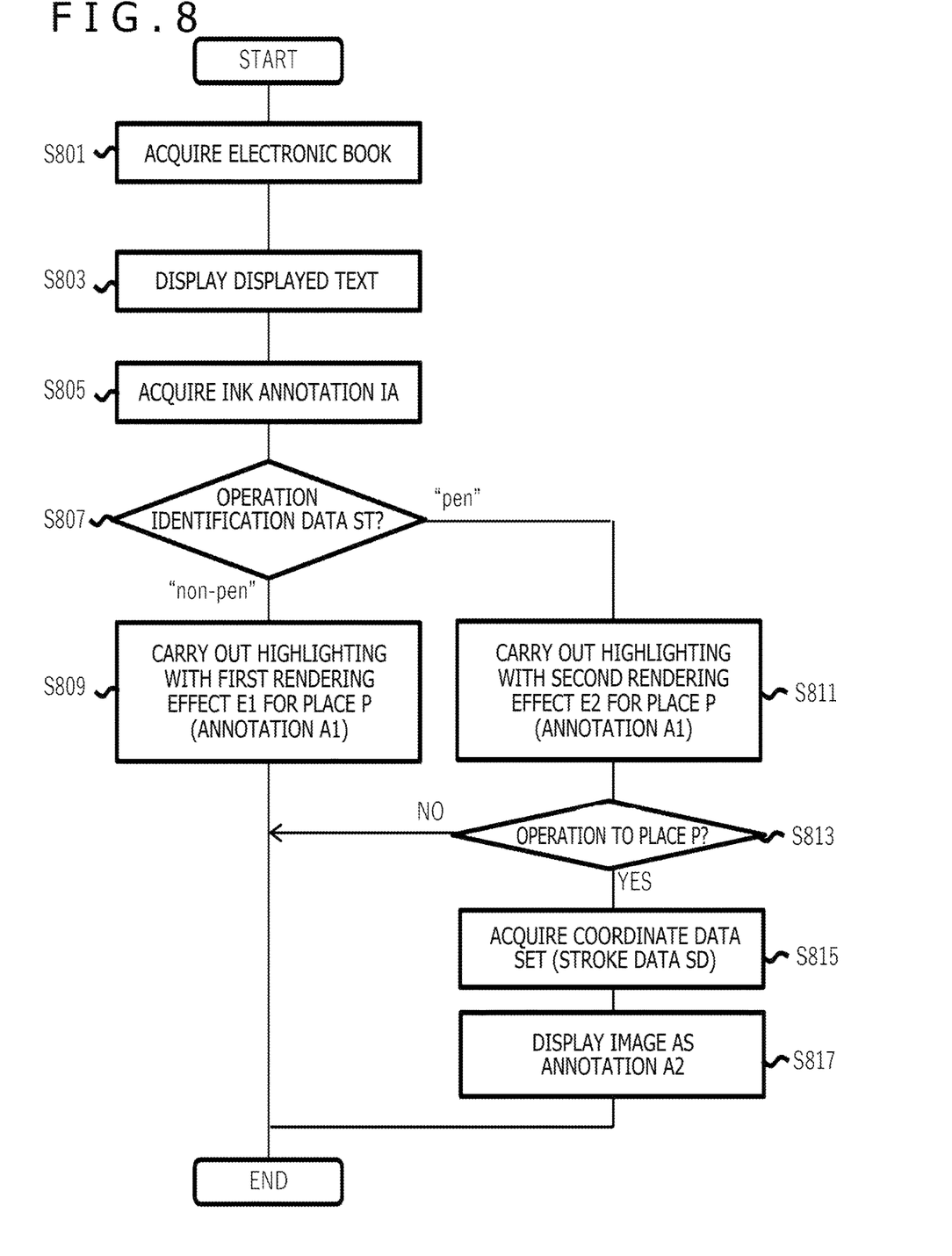
FIG. 8 is a flowchart relating to a display method of the ink annotation.
Figure 9:
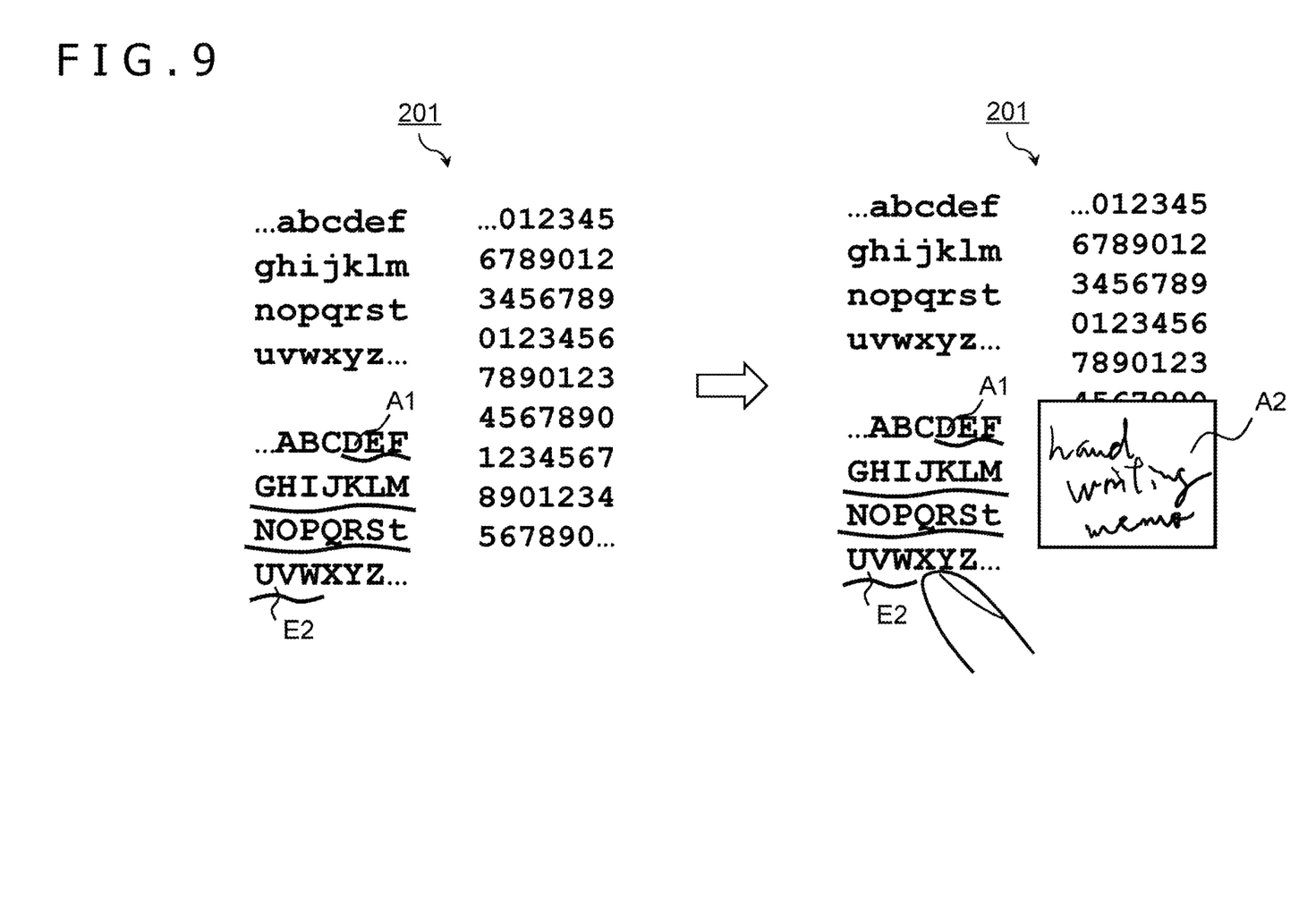
FIG. 9 is a diagram illustrating the ink annotation displayed on the terminal according to the flowchart of FIG. 8.

FIG. 8 is a flowchart relating to a display method of the ink annotation IA. FIG. 9 is a diagram illustrating the ink annotation IA displayed on the terminal 201 according to the flowchart of FIG. 8.

In step S801, the terminal 201 acquires an electronic book. Here, suppose that "e-Book #b1" associated with a value "b1" of the book identifier BID is acquired. In step S803, the terminal 201 displays the displayed text dt according to a reading position of the user u2. Due to the difference in display settings and the difference in the reading-end position of each user, normally, the displayed text dt2 for the second user u2 is not displayed in the same manner as the displayed text dt1 for the first user u1 (see FIG. 4A and FIG. 4B).

In step S805, the terminal 201 acquires the ink annotation IA. When the operation identification data ST having the "non-pen" value is included in the ink annotation IA in step S807, the terminal 201 carries out highlighting having the first rendering effect E1 at the place P (step S809). As described with reference to FIG. 3A and FIG. 3B, the first rendering effect E1 corresponds to highlighting, underlining, or drawing an enclosing line along the arrangement direction of text characters (d-direction in FIG. 10).

On the other hand, when the operation identification data ST having the "pen" value is included in the ink annotation IA in step S807, the terminal 201 carries out highlighting having a second rendering effect E2 at the place P (step S811). As illustrated in FIG. 10, the second rendering effect E2 corresponds to applying highlighting E21a or E21b, underlining E22, or drawing an enclosing line E23 that at least partly has a component obliquely intersecting the arrangement direction of text characters (d-direction) at an angle smaller than 90 degrees and is made unevenly or randomly in such a manner as not to be precisely along the arrangement direction of the characters (d-direction) in the text at the place P.

The unevenness of the second rendering effect E2 may be generated in accordance with a learned model that is learned with use of tremble and shake as training data (data for learning), wherein the tremble and shake is caused when a user draws a straight line for example. Further, the second rendering effect E2 may be matched to the display of the place P by calculating to mimic 1/f fluctuation using an intermittent chaos method, for example. In the display based on the second rendering effect E2, the annotation A1 of highlighting is added even when the display has a different column setting and, therefore, the second user u2 can easily recognize that a handwriting input using a pen has been made at the place P.

In step S813, the terminal 201 determines whether or not a predetermined operation S is carried out at the place P at which the second rendering effect E2 is rendered. When an operation such as a touch is carried out (YES of S813), the terminal 201 acquires the corresponding coordinate data set (the stroke data set SD) included in the ink annotation IA (step S815) and displays the image data indicated by the stroke data set SD as the annotation A2 at a position near the relevant place P as illustrated on the right-hand side of FIG. 9 (step S817).

As described above, when the operation S that specifies the place P of an annotation is carried out by a pen, a person with whom the annotation is shared can recognize that the annotation such as highlighting has been input with a handwriting pen. By reproducing tremble and shake caused when a human draws a straight line as the second rendering effect E2 having unevenness, even on a display having a different column setting or font, a natural-looking handwritten annotation based on a so-called "soft UI" can be displayed at the same place P.

SUMMARY OF EMBODIMENTS

As described above, the system of FIG. 1 includes the electronic book terminal 101 (first terminal) operated by the first user u1, the terminals 201 and 202 (second terminals) operated by the second and third users u2 and u3, and the sharing system 300 of the ink annotation IA. The ink annotation IA includes the stroke data set SD indicating an annotation for an electronic book and the metadata MD associated with the stroke data set SD. The metadata MD includes the user identifier UID that identifies the user, the book identifier BID that identifies the electronic book, and place data indicating the place P of the annotation.

The electronic book terminal 101 carries out a transmission step (S701) of transmitting the ink annotation IA generated by an operation of the user u1 to the ink annotation sharing system 300. The ink annotation sharing system 300 carries out an identification step (S703) of identifying the members (the users u2 and u3) of a group that relates to the electronic book and that is configured by the user u1 based on the values of the user identifier UID and the book identifier BID included in the ink annotation IA, and a supply step (S705) of supplying the ink annotation IA to the terminals 201 and 202 operated by the users u2 and u3.

The users u2 and u3 may be members of a group registered in the ink annotation sharing system 300, though they may have a different acquisition source of the electronic book from the first user u1 or may not have acquired the electronic book at all. The book identifier BID may be an ISBN. In the transmission step (S701), the ink annotation IA may be transmitted to the ink annotation sharing system 300 in a digital ink format.

The electronic book terminal 101 that forms part of the system of FIG. 1 includes the display device capable of displaying an electronic book, the touch sensor that detects a finger, the pen sensor that detects a pen, and the integrated circuit connected to each of the touch sensor and the pen sensor. The integrated circuit carries out a display step (S203) of displaying the text dt that forms part of the electronic book by using the display device. The integrated circuit carries out a detection step (S205) of detecting the operation S that specifies the place P of an annotation added to the text dt by using the touch sensor and the pen sensor. The integrated circuit carries out a determination step (S209) of carrying out a determination as to which sensor of the touch sensor and the pen sensor has detected the operation S, and an output step (S217, S221) of outputting place data indicating the place P of the annotation in a manner such that the result of the determination is identifiable (i.e., whether the touch sensor or the pen sensor has detected the operation S).

In the output step (S217, S221), the place data may be output together with the operation identification data ST that indicates the result of the determination. When the operation identification data ST includes a value indicating that the touch sensor has detected the operation S, the annotation may be displayed with the first rendering effect E1. When the operation identification data ST includes a value indicating that the pen sensor has detected the operation S, the annotation may be displayed with the second rendering effect E2 different from the first rendering effect E1. The second rendering effect E2 may be an effect of highlighting, underlining, or drawing an enclosing line in an uneven manner to include a fluctuating component extending in a direction orthogonal to the arrangement direction of text characters (d-direction) at the place P of the annotation. The uneven effect may be based on generating the fluctuating component in accordance with a learned model constructed by machine learning relating to a handwriting pattern of a straight line drawn by a human.

The electronic book terminal 101 may further carry out an activation step (S219) of activating the handwriting input window 504, in which a handwriting input is possible, when a specific operation S is detected by the pen sensor. The ink annotation IA may include the stroke data set SD indicating an annotation made by a handwriting input in the handwriting input window 504 and the metadata MD associated with the stroke data set SD. The metadata MD may include place data and the operation identification data ST, and the ink annotation IA may be transmitted in a state of being converted to a digital ink format in the output step (S221).

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

The invention claimed is:

1. An ink annotation sharing method, comprising:
   at a first terminal operable by a first user, generating an ink annotation including:
      a stroke data set indicating an annotation handwritten in an electronic book by the first user, and
      metadata associated with the stroke data set, wherein the metadata includes a user identifier that identifies the first user, a book identifier that identifies the electronic book, and place data indicating a place in the electronic book where the annotation is handwritten;
   transmitting the ink annotation from the first terminal to an ink annotation sharing system;
   identifying, by the ink annotation sharing system, a second user and a third user based on the user identifier included in the metadata of the ink annotation;
   supplying, by the ink annotation sharing system, the ink annotation to a second terminal of the second user, wherein the second user has access to the electronic book and the second terminal has a display column setting different from a display column setting of the first terminal;
   displaying the annotation handwritten by the first user on the second terminal of the second user, according to the display column setting of the second terminal such that the handwritten annotation appears differently from how the handwritten annotation appears on the first terminal;
   supplying, by the ink annotation sharing system, the ink annotation to a third terminal of the third user, wherein the third user does not have access to the electronic book; and
   displaying the annotation handwritten by the first user on the third terminal of the third user without displaying the electronic book on the third terminal.

2. The ink annotation sharing method according to claim 1, wherein the second user and the third user are each a member of a group registered in association with the first user in the ink annotation sharing system.

3. The ink annotation sharing method according to claim 1, wherein the book identifier is an international standard book number.

4. The ink annotation sharing method according to claim 1, wherein the ink annotation is transmitted in a digital ink format.

5. The ink annotation sharing method according to claim 1, wherein the handwritten annotation comprises handwritten illustration of artwork drawn by the first user.

6. The ink annotation sharing method according to claim 1, wherein the handwritten annotation comprises handwritten text written by the first user.

7. The ink annotation sharing method according to claim 1, wherein the metadata associated with the stroke data set includes a source identifier that identifies whether the annotation is handwritten with a pen or a finger touch.

8. The ink annotation sharing method according to claim 7, comprising:
   displaying the annotation on the second terminal and the third terminal, with a first rendering effect when the annotation is handwritten with a finger touch, and with a second rendering effect different from the first rendering effect when the annotation is handwritten with a pen.

9. The ink annotation sharing method according to claim 8, wherein the first rendering effect for the annotation handwritten with a finger touch includes highlighting, underlining, or drawing an enclosing line along an arrangement direction of text characters.

10. The ink annotation sharing method according to claim 8, wherein the second rendering effect for the annotation handwritten with a pen adds fluctuation to a line used to highlight, underline, or enclose a portion of the electronic book, in a direction orthogonal to a direction of the line, to effect an appearance of handwriting.

11. The ink annotation sharing method according to claim 10, wherein the fluctuation to be added is generated in accordance with a learned model constructed by machine learning related to a handwriting pattern of a straight line drawn by a human.

12. The ink annotation sharing method according to claim 1, comprising:
   activating, by the first terminal, a window in which the first user may handwrite the annotation.

13. The ink annotation sharing method according to claim 12, wherein the first terminal activates the window in response to detecting a user request to annotate the electronic book.

14. A system comprising:
   a first terminal operable by a first user having access to an electronic book;
   a second terminal operable by a second user having access to the electronic book;
   a third terminal operable by a third user not having access to the electronic book; and
   an ink annotation sharing system,
   wherein
   the first terminal, in operation, generates an ink annotation which includes:
      a stroke data set indicating an annotation handwritten in the electronic book by the first user, and
      metadata associated with the stroke data set, wherein the metadata includes a user identifier that identifies the first user, a book identifier that identifies the electronic book, and place data indicating a place in the electronic book where the annotation is handwritten, the first terminal, in operation, transmits the ink annotation to the ink annotation sharing system, the ink annotation sharing system, in operation, identifies the second user and the third user based on the user identifier included in the metadata of the ink annotation, the ink annotation sharing system, in operation, supplies the ink annotation to the second terminal and the third terminal, wherein the second terminal has a display column setting different from a display column setting of the first terminal, the second terminal, in operation, displays the annotation handwritten by the first user according to the display column setting of the second terminal such that the handwritten annotation appears differently from how the handwritten annotation appears on the first terminal, and the third terminal, in operation, displays the annotation handwritten by the first user without displaying the electronic book.

15. The system of claim 14, wherein the handwritten annotation comprises handwritten illustration of artwork drawn by the first user.

16. The system of claim 14, wherein the handwritten annotation comprises handwritten text written by the first user.

17. The system of claim 14, wherein the second user and the third user are each a member of a group registered in association with the first user in the ink annotation sharing system.

18. The system of claim 14, wherein the ink annotation is transmitted in a digital ink format.

19. The system according to claim 14, wherein the metadata associated with the stroke data set includes a source identifier that identifies whether the annotation is handwritten with a pen or a finger touch.

20. The system according to claim 19, wherein the second terminal, in operation, displays the annotation with a first rendering effect when the annotation is handwritten with a finger touch, and with a second rendering effect different from the first rendering effect when the annotation is handwritten with a pen.

* * * * *